United States Patent [19]
Crandon et al.

[11] 3,902,693
[45] Sept. 2, 1975

[54] MOLD FOR CASTING LENSES

[75] Inventors: Harry D. Crandon, Woodstock, Conn.; Donald H. Petcen, Sturbridge, Mass.

[73] Assignee: American Optical Corporation, Southbridge, Mass.

[22] Filed: Aug. 9, 1974

[21] Appl. No.: 495,944

Related U.S. Application Data

[63] Continuation of Ser. No. 340,143, March 12, 1973, abandoned.

[52] U.S. Cl. ............... 249/134; 425/808; 425/410; 425/812
[51] Int. Cl.² ..................... B29C 5/00; B29D 11/00
[58] Field of Search ............ 425/808; 249/134, 117

[56] References Cited
UNITED STATES PATENTS

| | | | |
|---|---|---|---|
| 2,233,057 | 2/1941 | Luce | 425/808 |
| 2,459,205 | 1/1949 | Wells et al. | 425/808 |
| 3,211,811 | 10/1965 | Lannan | 425/808 |
| 3,248,460 | 4/1966 | Naujokas | 425/808 X |
| 3,380,718 | 4/1968 | Neefe | 425/808 |
| 3,422,168 | 1/1969 | Bowser | 425/808 |
| 3,555,611 | 1/1971 | Reiterman | 425/808 |

*Primary Examiner*—J. Howard Flint, Jr.
*Attorney, Agent, or Firm*—H. R. Berkenstock, Jr.; William C. Nealon

[57] ABSTRACT

A lens casting mold comprising a lower bucket assembly including a concave glass mold half having an upstanding annular liner of pliable material. The liner is peripherally sealed to the concave mold half for containing a liquid casting monomer placed in the lower bucket assembly and an upper mold piece including a depending convex glass mold half is adapted to extend into the lower bucket assembly to displace the liquid monomer into the configuration of a lens between the concave and convex mold halves. Curing of the cast monomer completes the lens.

9 Claims, 9 Drawing Figures

PATENTED SEP 2 1975 3,902,693

MOLD FOR CASTING LENSES

This is a continuation of application Ser. No. 340,143, filed Mar. 12, 1973, now abandoned.

BACKGROUND OF THE INVENTION

1. Field of the Invention:

Apparatus for casting plastic lenses with particular reference to a novel two-part casting mold.

2. Description of the Prior Art:

Lenses formed of liquid monomers such as allyl diglycol carbonate have, heretofore, been cast in three-part molds made up of a pair of glass mold halves, one having a concave casting surface and the other a convex casting surface, which are held in spaced relationship by an annular supporting ring or gasket. In some cases, as for example in U.S. Pat. Nos. 2,728,106 and 2,890,486, the mold halves are supported on shouldered portions of a rigid annulus with gravity being relied upon to retain the proper relationship of spacing therebetween. Another, common arrangement of casting mold includes an annular resilient gasket having a generally T-shaped cross-sectional configuration against which two glass mold halves are clamped, usually with a C-shaped spring clamp as illustrated in U.S. Pat. Nos. 3,109,696; 3,136,000 and 3,460,928, for example. These prior art casting apparatuses require separate hand filling operations usually performed hypodermically into the cavity between mold halves. Venting of the cavity is necessary as is overfilling so as to assure complete elimination of air and gases from between the effective casting surfaces and an adequate supply of the monomer.

In addition to the time consuming and costly problem of preparing syringes or similar devices for injecting the fluid monomer, the need to overfill is accompanied by a waste of material, messyness and an attendant cleaning problem.

Also, the need for a different gasket or annulus for each change of lens power, the ungainliness of C-clamps and difficulty frequently experienced in applying such clamps, variations in their clamping pressures which tend to correspondingly affect the spacing between mold halves and final lens thicknesses and shapes as well as releasability from mold halves after curing and removal of the clamps, all render prior art plastic lens casting operations difficult to perform, inefficient and relatively unpredictable in end result as well as inapplicable to automated casting systems.

A principle objective of the present invention is to overcome the aforementioned drawbacks of prior art lens casting devices with a novel design of a lens casting mold. The mold is adaptable to automated systems. Injection filling operations and the messyness of overfilling are obviated and a substantial savings in tooling and equipment cost is realized. Each mold of the present invention is adaptable to the casting of a range of powers of lenses as opposed to the prior art need for a change of gasket for each change of lens power.

SUMMARY OF THE INVENTION of the Invention

The foregoing objective and its corolaries are accomplished through the provision of a novel two-part casting mold having a lower bucket assembly formed of a concave glass mold half having an upstanding annular liner of pliable material peripherally sealed to the concave mold half for receiving and containing a supply of a liquid casting monomer. An upper mold piece having a depending convex glass mold half is constructed and arranged to fit into the circular enclosure produced by the liner of the lower bucket assembly with its convex glass mold half extended into the supply of liquid casting monomer, displacing the monomer into the configuration of a lens to be cast in the mold. Venting of the lower bucket assembly prevents entrappment of air or gases between the concave and convex mold halves and a resevoir area is provided to freely receive amounts of the casting monomer in excess of that required to produce the configuration of the lens. This excess of liquid monomer is completely contained within the casting mold throughout the cycle of producing the lens thereby obviating the messyness of spilling and cleaning heretofore encountered in lens casting operations. The liquid monomer may be poured into the large open end of the lower bucket assembly without a need for complicated hypodermic or other injection devices. Spring clamps are obviated and the two-part feature of the mold renders the filling and mold assembly operations readily adaptable to automation.

Details of the invention will become more readily apparent from the following description taken in conjunction with the accompanying drawings.

IN THE DRAWINGS

DESCRIPTION OF THE PREFERRED EMBODIMENTS

Figure 1:
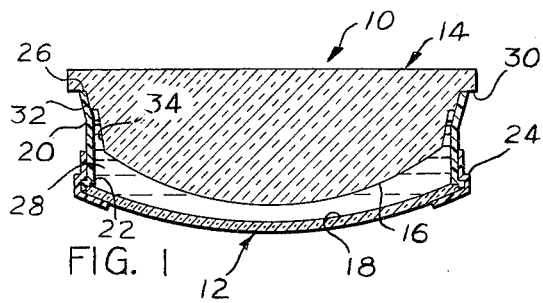
FIG. 1 is a vertical cross-sectional view of an embodiment of the invention.

Referring more particularly to FIG. 1 of the drawings, lens casting mold 10 comprises a lower bucket assembly 12 and an upper mold piece 14 having a depending convex mold half 16.

Bucket assembly 12 is made up of a lower concave mold half 18 of glass having an upwardly directed annular wall-like liner 20 completing the bucket assembly. Liner 20 may be injection molded of a polyethylene plastic, for example. It is provided with a shouldered depending edge 22 against which lower mold half 18 is positioned. A band 24 of heat-shrinkable material either in the form of tubing or an adhesive tape, preferably the latter, forms a fluid-tight seal between lower mold half 18 and liner 20.

With the upper mold piece 14 lifted away from bucket assembly 12, the large opening defined by rim 26 of liner 20 permits ready access into bucket assembly 12 for insertion of a liquid monomer lens casting medium 28 such as, for example, allyl diclycol carbonate. A measured or metered amount of the liquid monomer is displaced into the configuration of a lens to be cast by lowering upper mold piece 14 into bucket assembly 12 to a point where the depending convex surface of mold half 16 is properly spaced from and centered relative to mold half 18. This spacing and centering is accomplished by bringing shoulder 30 of mold piece 14 to rest against rim 26 of liner 20 as shown in FIG. 1 with edge 23 of mold piece 14 fitted into liner 20. The former fixes the spacing between mold halves 16 and 18 according to the center thickness desired of the lens being cast and the latter centers mold piece 14 in assembly 12.

Mold piece 14 is further stepped inwardly beneath edge 23 to provide an annular resevoir 34 into which excess amounts of the liquid monomer 28 may become displaced by the lowering of mold piece 14 thereinto and/or as a result of expansion on heating. The excess of monomer 28 is resevoir 34 also accommodates for shrinkage resulting from polymerization during its subsequent curing.

The amount of liquid monomer 28 poured or otherwise dispensed into bucket assembly 12 is preferably measured or metered so as to be equal to and preferably slightly greater in volume than the amount required for forming the full diametral size and thickness of the lens to be cast between mold halves 16 and 18. The excess, however, is not permitted to exceed the capacity of resevoir 34 and/or otherwise spill over or outwardly of liner 20 at any time in either its normal or expanded state.

After having displaced monomer 28 in mold 10 into the configuration of a lens as shown in FIG. 1, the complete unit of mold 10 and monomer 28 is heated for a time period of approximately from 4 to 5 hours, starting at a temperature of approximately 125°F and then increasing the temperature in steps of from approximately 3° to 8° each to approximately 160°F. The latter temperature is reached and held for a period of approximately 1 hour prior to termination of the 4 to 5 hour curing cycle.

Other curing cycles may be used. For example, a longer curing cycle may begin at a lower temperature of approximately 120°F held for a relatively long period of time, e.g., 8 to 10 hours and then stepped upwardly in three or four increments of from 3° to 15° each over a period of approximately 2 hours to a maximum temperature of approximately 149°F held for a period of approximately 2 hours with the total curing time being from 12 to 14 hours.

Figure 9:
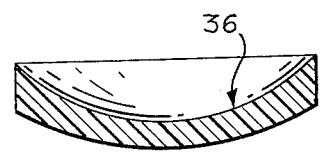
FIG. 9 is a cross-sectional view of a lens resulting from practice of the present invention.

Upon completion of the curing cycle, the unit of mold 10 and cured monomer 28 is cooled to approximately room temperature, its liner 20 and tape 24 is stripped away, the remaining assembly is washed with water or another cleaning fluid such as methylene chloride and mold halves 16 and 18 are removed. The resulting cast lens 36 (FIG. 9) is then postcured, e.g., at a temperature of approximately 200°F for a period of approximately 40 minutes and cooled to room temperature.

Subsequent operations of rendering lens 36 (FIG. 9) adaptable to spectacle frames and useful as a corrective lens, may comprise the grinding and polishing of either the convex or concave side of the lens, peripheral cutting to a desired lens shape with either a flat or beveled edge and, in the former case, possible drilling for mounting purposes. All operations subsequent to the above described casting, curing and postcuring of lens 36 do not form a part of the present invention and, accordingly, will not be further dealt with in this case.

Figure 2:
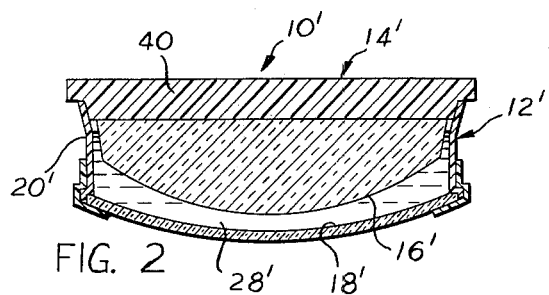
FIG. 2 is a similar cross-sectional view of a modification of the lens casting mold shown in FIG. 1.

Referring more particularly to FIG. 2, casting mold 10' has lower bucket assembly 12' which is identical to lower bucket assembly 12 of the embodiment of the invention shown in FIG. 1. Upper mold piece 14' of casting mold 10', however, is formed of two pieces wherein convex mold half 16' is cemented to a supporting cap 40. Cap 40 is preferably cast to the configuration illustrated (i.e., the configuration of the uppermost portion of mold piece 14) directly upon convex mold half 16' in a master mold of silicone rubber or its equivalent (not shown). This technique of forming the upper mold piece for casting molds of the type shown in FIGS. 1 and 2 minimizes tooling costs and time required for casting and grinding the shoulder and edge portions 30 and 32 respectively of FIG. 1. The use of cap 40 (FIG. 2) in the fabrication of upper mold pieces such as 14' facilitates the control of all critical dimensions of the upper mold piece regardless of variations in size, shape and curvature of the depending mold half 16' thereof.

The modification of the invention shown in FIGS. 3–8 comprises casting mold 10'' having lower bucket assembly 12'' which is similar in construction to bucket assembly 12 and 12' of FIGS. 1 and 2. Liner 20'' of bucket assembly 12'' includes, in this case, at least one vertically extending vent opening 42, best illustrated in FIG. 4. Opening 42 is preferably formed during the manufacture of liner 20'', e.g., by injection molding. Thus, in its simplest form it comprises a longitudinally directed slot molded into the wall of the liner. If desired, however, opening 42 may be formed by cutting or impressing the inner wall of the liner 20''.

Lower mold half 18'' of casting mold 10'' is secured to liner 20'' with a multiple wrap or banding of a heat shrinkable plastic tape 24'', preferably of the type having an adhesive coating on at least one of its sides. Thus, in addition to the tightening of lower mold half 18'' against liner 20'' by heat shrinking the tape 24'', adhesive material on the surface of the tape seals bucket assembly 12'' tightly against leakage of a liquid monomer 28'' placed therein for the casting of a lens.

Figure 3:
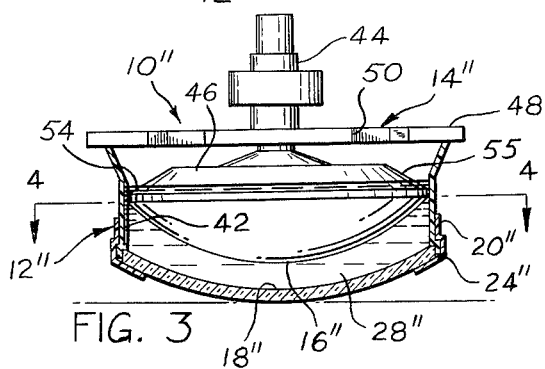
FIG. 3 is a partially cross-sectioned side elevational view of a further modification of the invention.
Figure 4:
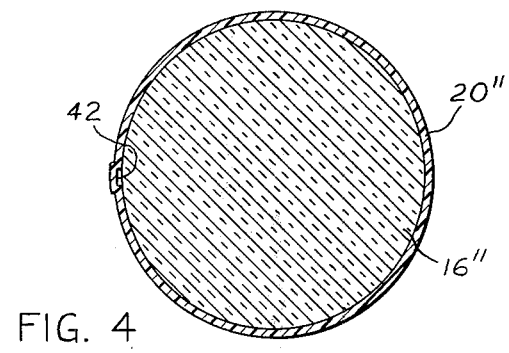
FIG. 4 is a transverse cross-sectional view taken along line 4—4 of FIG. 3.

Upper mold piece 14'' of casting mold 10'', in differing from the corresponding parts of the FIGS. 1 and 2 embodiments of the invention, is provided with a depending convex mold half 16'' of an outer diametral size controlled to fit snugly within annulus 22'' when inserted for casting the monomer 28'' to the desired lens shape as illustrated in FIG. 3.

Mold half 16'' is further provided with a shank 44 which is adhesively secured to surface 46, e.g., with an epoxy cement or its equivalent. Fixed to shank 44 is leveling plate 48 disposed perpendicularly to the axis of mold half 16''. Plate 48 may be perforated and/or peripherally notched at points 50, for example, mainly for purposes of freely venting bucket assembly 12'' during and following the insertion of upper mold piece 14'' thereinto as will be described in detail hereinafter.

Figure 5:
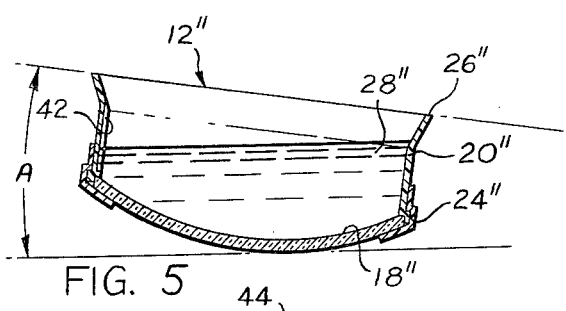
FIGS. 5, 6, 7 and 8 are diagrammatic illustrations of a preferred technique for casting a lens according to the invention.

Referring more particularly to FIGS. 5–9, the casting of a lens similar to lens 36 (FIG. 9) with mold 10'' is accomplished as follows:

Lower bucket assembly 12'' is tilted slightly, e.g., 6° or 7° relative to a horizontal bench or table top or other similar supporting surface as shown in FIG. 5, causing a liquid monomer 28'' placed therewithin to seek a level adjacent its side opposite to vent opening 42. Opening 42 is thereby clear of monomer 28 for subsequent venting of bucket assembly 12'' as follows.

Figure 6:
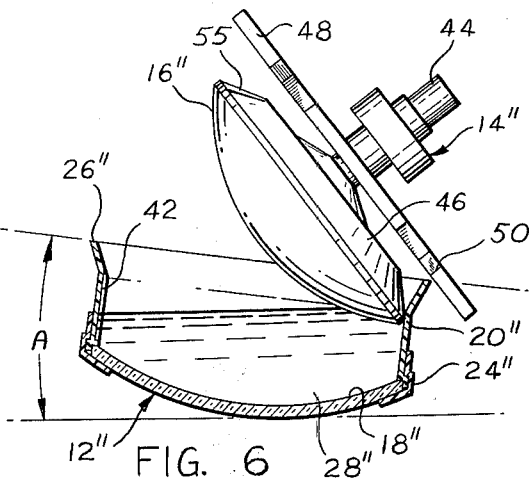
Figure 7:
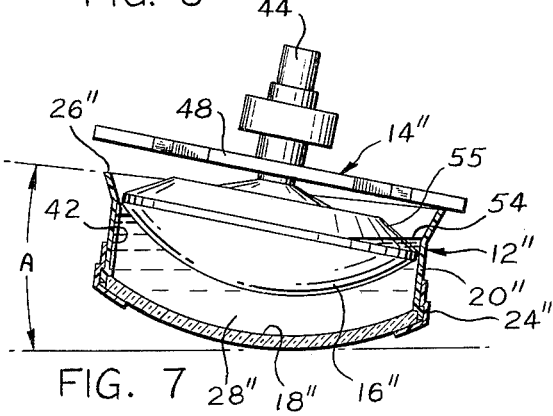

While held tilted at angle A as shown in FIGS. 5–7, upper mold piece 14'' is inserted edgewise into monomer 28'' with plate 48 extended over rim 26'' of liner 20'' (FIG. 6). Upper mold piece 14'' is next rocked toward vent opening 42 generally in the direction of arrow 52 forcing air and gases away from the lowermost convex surface of mold half 16" initially outwardly through the open end of bucket assembly 12" and finally, as shown in FIG. 7, outwardly through vent opening 42. After all air is forced from between upper mold halfe 16" and the liquid monomer 28", further movement of upper mold piece 14" downwardly arcuately into bucket assembly 12" forces the excess of monomer 28" upwardly through vent opening 42 into a resevoir 54 formed by chamber 55 extending peripherally around surface 46 of mold half 16". Resevoir 54 is best illustrated in FIGS. 3, 7 and 8.

Figure 8:
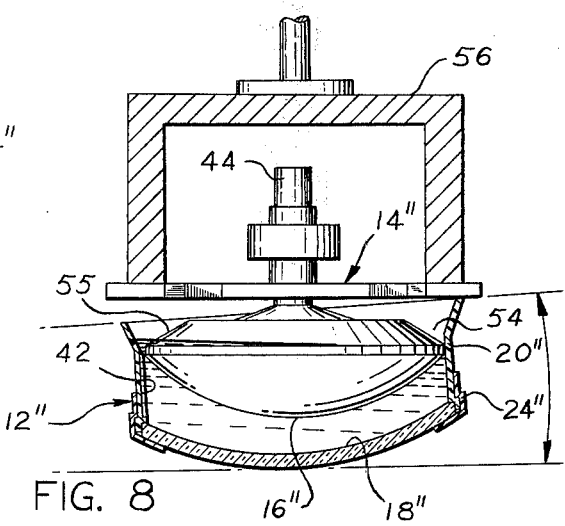

Proceeding from FIG. 7 to the final condition of assembly shown in FIG. 3, upper mold piece 14" is pressed further into lower bucket assembly 12" with tool 56 (FIG. 8). Pressure may be applied manually or mechanically to tool 56 forcing plate 48 to seat flatly against rim 26" of upper mold piece 14". During this latter procedure, however, lower bucket assembly 12" is tilted a few degrees, e.g., 3°, relative to the horizontal plane of the aforementioned supporting table top or the like in a direction oppositely to that shown in FIG. 7 so as to cause the excess amount of monomer 28" in resevoir 54 to cover vent opening 42. Thus, during the leveling and seating of plate 48 upon rim 26" of bucket assembly 12" to the position shown in FIG. 3, by forcing tool 56 downwardly, air or gases will be prevented from re-entering the casting space between upper and lower mold halves 16" and 18". Tool 56 is retracted and casting mold 10", now having monomer 28" displaced into the configuration of a lens between mold halves 16" and 18" as shown in FIG. 3, is placed in a suitable oven or furnace (not shown) for curing of the monomer 28". The curing and postcuring cycles outlined hereinabove relative to the casting of lenses in the FIGS. 1 and 2 embodiments of the invention are exemplary.

From the foregoing description of the present invention, it should be apparent that a wide range of powers (i.e., different combinations of convex and concave curvatures and center thicknesses of lenses) may be cast with any one of the embodiments of this invention simply by changing one or both of mold halves 16 – 18, 16' – 18' or 16" – 18". The messyness and attending cleaning problems of prior art overfilling of mold cavities with liquid monomers are obviated, a substantial savings in tooling and equipment costs is realized and casting molds of the type shown and described herein are adaptable to systems for automating lens casting. For example, shank 44 of casting mold 10" may be attached to suitable mechanical means (not shown) for performing the operation of insertion of upper mold piece 14" into the lower bucket assembly 12" which is depicted in FIGS. 5–7. The release of shank 44 from such a mechanism, following completion of the step illustrated in FIG. 7, and incorporation of tool 56 shown in FIG. 8 to complete the assembly operation is contemplated. The aforementioned bench or table top referred to as a probable surface for supporting the bucket assembly 12" of mold 10" may also be in the form of a horizontal conveyor belt or rotatable table.

We claim:

1. A mold for casting a lens comprising:
    a lower bucket assembly including a rigid lower concave mold half, an upstanding annular wall member of thin pliable material extending peripherally about and upwardly from said concave mold half, the uppermost edge of said wall member defining a rim of said bucket assembly;
    fluid-tight sealing means connecting said wall member to said concave mold half for supporting a liquid casting medium in said assembly;
    an upper mold piece having a first portion of greater diametral dimension than said rim of said bucket assembly and including a depending rigid convex mold half of lesser diametral dimension than said rim, said depending mold half being adapted to extend through said rim into said bucket assembly toward said lower mold half to displace said liquid casting medium into the configuration of a lens to be cast, said portion of said upper mold piece of greater diametral dimension being adapted to rest upon said rim for extablishing the thickness dimension of said lens and said upper mold piece forming a continuous annular reservoir area between said depending mold half, said first portion and said upstanding wall for receiving amounts of said casting medium in excess of that forming the configuration of said lens.

2. A mold according to claim 1 wherein said upper mold piece is peripherally shouldered to form said part of larger diametral dimension and therebeneath is further inwardly shouldered to form said reservoir area.

3. A mold according to claim 2 wherein said upper mold piece is formed entirely of glass.

4. A mold according to claim 2 wherein said part of said upper mold half of larger diametral dimension is formed of a rigid plastic material and said shouldered portion therebeneath is formed of glass, said rigid plastic material and glass being fixedly secured together.

5. A mold according to claim 1 wherein said depending convex mold half of said upper mold piece is constructed and arranged to fit snugly into said annular wall of said lower bucket assembly when extended thereinto and further includes an upwardly extending shank and an orthogonal plate fixed to said shank, said plate forming said portion of said upper mold half of greater diametral dimension.

6. A mold according to claim 5 wherein said annular wall member is provided with a vertically extending channel adjacent one of its sides providing communication between spaces formed above and below said convex mold half when said convex mold half is fully extended into said bucked assembly, said communication permitting a free flow of air and liquid matter between said spaces above and below said convex mold half.

7. A mold according to claim 6 wherein said space above said convex mold half is formed at least in part by a chamfer, said chamfer affording a reservoir area for receiving air and liquid matter caused to flow upwardly through said vent opening.

8. A mold according to claim 5 wherein said shank and plate are formed of metal and said convex mold half is formed of glass.

9. A mold for casting a lens comprising:
    a lower bucket assembly including a rigid lower concave mold half, an upstanding annular wall member of thin pliable material extending peripherally about and upwardly from said concave mold half, the uppermost edge of said wall member defining a rim of said bucket assembly;

fluid-tight sealing means connecting said wall member to said concave mold half for supporting a liquid casting medium in said assembly;

an upper mold piece including a rigid convex mold half adapted to extend at least partially through said rim into said bucket assembly toward said lower mold half to displace said liquid casting medium into the configuration of a lens to be cast, and a reservoir area communicating with internal portions of said bucket assembly for receiving amounts of said casting medium in excess of that forming the configuration of said lens.

\* \* \* \* \*